Patented Oct. 10, 1939

2,175,793

UNITED STATES PATENT OFFICE 2,175,793

PHENOLIC CONDENSATION PRODUCT

Ludwig Cserny, Wiesbaden, Germany, assignor to The Resinous Products & Chemical Co., Philadelphia, Pa., a corporation of Delaware No Drawing. Application March 3, 1936, Serial No. 66,849. In Germany March 4, 1935

2 Claims. (Cl. 260—45)

This invention relates to the preparation of glass-clear, colorless phenol-carbonyl condensation products which have greatly improved resistance to the action of light and is a continuation-in-part of application Serial No. 1,171 filed January 10, 1935, now Patent 2,075,340.

It is known that practically all phenolic condensation products have a decided tendency to darken on exposure to light. It is also known that cloudy or ivory-like products can be obtained by condensing one to three mols of formaldehyde and one mol of phenol with an alkaline catalyst, acidifying with lactic acid and subsequently dehydrating and hardening the product. By reducing the amount of alkali used the product obtained is rendered more nearly transparent but in no case has it been possible to produce a glass-clear, transparent material in this way. The final product is always somewhat cloudy and under the best conditions only a semi-transparent material containing particles of the clouding material, viz: sodium lactate, could be obtained.

In order to obtain completely clear and transparent products it is necessary to use only such acids and bases as will give salts which are soluble in the gel of phenol-carbonyl condensation product. Sodium lactate is not soluble in this gel. It has been proposed in this connection to use potassium hydroxide and phthalic acid and in this way transparent products have been obtained. In this case, however, the solubility of the potassium phthalate is not very great. If the amounts of potassium hydroxide and phthalic acid used are equivalent to the amounts of sodium hydroxide and lactic acid usually used in the production of ivory-like materials, the product will be cloudy. Furthermore, the light resistance of the resin containing the potassium phthalate is not very great.

It is an object of this invention to provide a method whereby a glass-clear, transparent phenol-carbonyl condensation product of high resistance to the action of light may be obtained.

It has been found that a perfectly transparent, glass-clear, phenol-carbonyl condensation product may be obtained from the same materials usually employed in making the ivory-like product, if to the liquid condensation product there is added before, during or after dehydration a urea-formaldehyde condensation product. This mixture is then dehydrated and hardened yielding the glass-clear, transparent product. This mixed product may be hardened to a gel, before or after dehydration, which may be readily cut with a knife, at ordinary temperatures, into rods, blocks, sheets, strips etc., which may then be arranged in a mold in any desired design and united and hardened under pressure at an elevated temperature not exceeding approximately 100° C. In this case it is advantageous to subject the rods, sheets etc. to a further dehydration before welding them in a mold. During this drying process several per cent. of moisture may be evaporated. The welded products may be further hardened by the action of heat alone or of heat and pressure. The products made in this way are superior to those made only with gel-soluble salts. The resins obtained have a greater transparency and purity of color and are in addition much more resistant to the action of light.

The following examples will serve to illustrate the invention which, however, is not limited to the exact details shown as it may be otherwise practiced within the scope of the appended claims.

Example 1

400 parts of phenol, 1000 parts of 30% formaldehyde and 45 parts of 44% sodium hydroxide are condensed under a reflux condenser for twelve minutes. The product is then acidified with 70 parts of 80% lactic acid and dehydrated under reduced pressure. During or after dehydration 330 parts of a urea-formaldehyde condensation product made from one mol of urea and three mols of formaldehyde is added for every 1000 parts of the anhydrous phenol-formaldehyde product and the dehydration is continued for a short time. The mixed product is then poured into molds and hardened until a gel is formed which may be readily cut with a knife. The block so obtained is then sliced into thin sheets which are dried several hours at 70° C. and then welded together under a pressure of about 60 atmospheres at about 70° C. to form sheets of greater thickness. Following this the plates are kept at 70° C. without the action of pressure for two to four days in order to complete the hardening. The gel may also be cut in other forms and shapes and the pieces thus obtained arranged in a mold prior to the final hardening. The product thus obtained is completely glass-clear and transparent and extremely resistant to the action of light.

Example 2

A gel is prepared as shown in Example 1 and hardened to the point at which it may be ground to a powder. This is then placed in a mold and heated under pressure at a temperature not exceeding 100°, preferably at 70–80° so to complete the hardening.

The gels and final condensation products obtained according to the present invention are the joint condensation product of a liquid phenol-carbonyl condensation product and a urea-formaldehyde condensation product, which contains a gel-soluble salt, preferably sodium lactate.

Other materials such as pigments, soluble and insoluble dyes, small particles of metal foil, bronze powder etc. may be added to the liquid phenol-carbonyl condensation product before forming the gel, in order to obtain any desired color design in the final article by arranging pieces of various colors or pigment content in a mold prior to welding and final hardening.

The method is also applicable to other phenols, such as cresol, and to condensation products of phenols with ketones as, for example, 4, 4' dihydroxy-diphenyl-dimethyl methane.

The product obtained is suitable for making buttons, fountain pen barrels, cigarette holders, ash trays, umbrella handles, knife handles, and a wide variety of other articles particularly where glass-clear products are desired.

I claim:

1. The process of producing glass-clear, transparent, light-resistant phenol-carbonyl condensation products comprising condensing a phenol and from one to three molecular equivalents of formaldehyde in the presence of an alkali, acidifying with lactic acid, adding a reactive urea-formaldehyde condensation product and heating to completely harden the mixture.

2. The process of producing glass-clear, transparent, light resistant phenol-carbonyl condensation products comprising condensing a phenol and from one to three molecular equivalents of formaldehyde in the presence of an alkali, acidifying with lactic acid, adding a reactive urea-formaldehyde condensation product and heating to form a gel which may be cut with a knife at ordinary temperatures.

LUDWIG CSERNY.